United States Patent
Uchiyama

(10) Patent No.: US 7,499,641 B2
(45) Date of Patent: Mar. 3, 2009

(54) OPTICAL APPARATUS

(75) Inventor: Minoru Uchiyama, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 357 days.

(21) Appl. No.: 11/553,804

(22) Filed: Oct. 27, 2006

(65) Prior Publication Data
US 2007/0116453 A1   May 24, 2007

(30) Foreign Application Priority Data
Nov. 24, 2005 (JP) .............................. 2005-338133

(51) Int. Cl.
*G03B 7/093* (2006.01)
(52) U.S. Cl. .................... 396/246; 396/213; 396/257
(58) Field of Classification Search ............. 396/63–66, 396/166–167, 169–170, 213, 246, 249, 256–257; 348/362–363
See application file for complete search history.

(56) References Cited

U.S. PATENT DOCUMENTS
5,937,221 A * 8/1999 Yamamoto et al. .......... 396/429

FOREIGN PATENT DOCUMENTS
JP          3041543 B     11/1992
JP       2003-169248 A    6/2003

* cited by examiner

*Primary Examiner*—Bot LeDynh
(74) *Attorney, Agent, or Firm*—Canon U.S.A., Inc. I.P. Division

(57) ABSTRACT

An optical apparatus includes a mechanical shutter in addition to a mechanical diaphragm. The optical apparatus obtains a shutter shifting amount based on acceleration data of the shutter, obtains a total light exposure in a period of time required for the shutter to completely close an aperture of the diaphragm having a predetermined F-number, and calculates an actual exposure time by dividing the total light exposure by a light exposure per unit time calculated from an aperture area of the diaphragm having the predetermined F-number in an opened state.

7 Claims, 7 Drawing Sheets

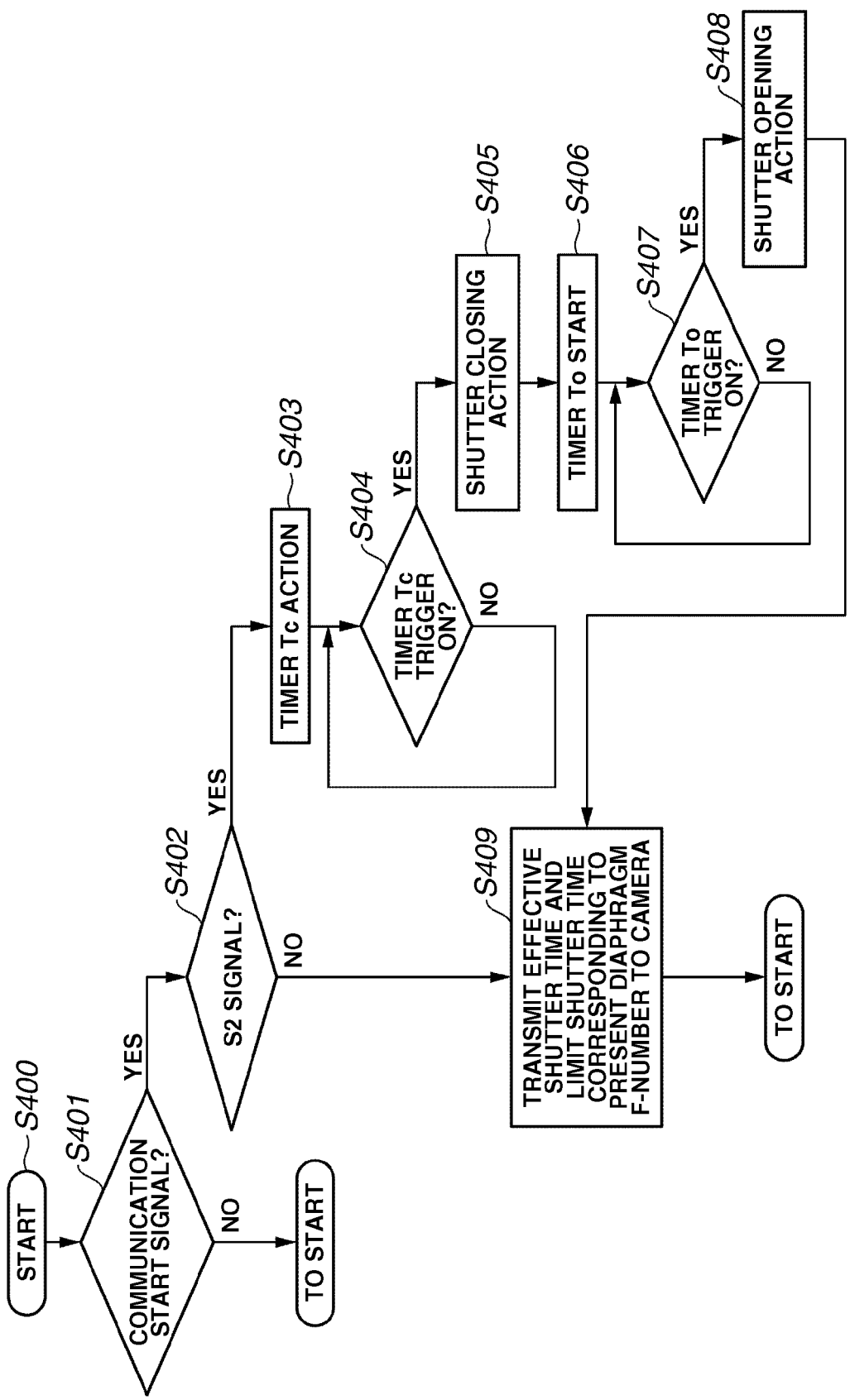

OPTICAL APPARATUS

This application claims foreign priority based on Japanese Patent Application No. 2005-338133, filed Nov. 24, 2005, the content of which is incorporated herein by reference in its entirety.

BACKGROUND OF THE INVENTION

1. Field of the Invention

The present invention relates to an optical apparatus, such as a video camera, which can perform a still image shooting operation based on a fixed F-number using a mechanical shutter and an electronic shutter.

2. Description of the Related Art

Advanced video cameras have the capability of shooting high resolution still images in addition to the capability of shooting moving images. The still image shooting operation of the video camera is generally realized by combining a mechanical shutter and an electronic shutter. The electronic shutter can control the start timing and the reset timing of storing an electric charge in an image sensor.

With the combination of a mechanical shutter and an electronic shutter, even a video camera equipped with an image sensor which cannot perform interlace shooting can realize a progressive still image shooting operation (see Japanese Patent Application Laid-Open No. 2003-169248). The light exposure in the still image shooting mode can be expressed by the quantity of light exposure in a duration from the reset off timing of an image sensor to the complete closure of the mechanical shutter.

The electronic shutter, due to its nature, can quickly reset the light quantity within a short period of time. On the other hand, the mechanical shutter requires a relatively long time to completely close. Therefore, the light quantity gradually changes according to the motion of the mechanical shutter. In this case, the shutter time and speed represent time and speed during the period of time from the reset off of the image sensor to the complete closure of the mechanical shutter.

An actual exposure time can be defined as a total light exposure in the duration from the shutter opening action start timing (i.e., the reset off timing of the image sensor) to the complete closure timing of the mechanical shutter, normalized by a unit light exposure in an opened state.

The actual exposure time is generally dependent on the action pattern and individual differences of the mechanical shutter, and accordingly, the light exposure varies depending on each shutter. Therefore, accurately obtaining an actual exposure time is important. As discussed in Japanese Patent No. 3041543, the actual exposure time can be calculated in the following manner.

The optical apparatus disclosed in Japanese Patent No. 3041543 does not include an electronic shutter. Instead, a mechanical diaphragm performs an opening/closing action to realize a shutter function. In this case, the actual exposure time can be obtained based on an aperture area of the diaphragm and the time required for the shutter opening/closing action.

If the shutter opening/closing action is a uniform accelerated motion, the light exposure during the shutter action changes along a trapezoidal area. However, if the opening action and the closing action are mutually different, an actual change of the light exposure may deviate from a trapezoidal area.

Furthermore, in a system including a combination of a mechanical shutter and an electric shutter, an opening action is performed by the electronic shutter and a closing action is performed by the mechanical shutter causing a uniform accelerated motion. Accordingly, the transitional change of the light exposure cannot be expressed by a trapezoidal area. Thus, using the approximation with a trapezoidal area will cause errors.

Moreover, a stepping motor (hereinafter referred to as an "STM") can be used to drive a shutter. The STM is generally configured to allow counting the number of control pulses to measure a shifting amount of the STM. Thus, the STM can control an aperture area of the shutter.

Accordingly, when the momentary light exposure changes along a predetermined trapezoidal area, the actual light exposure can be obtained based on the aperture area and the time required for the shutter opening/closing action. However, a simple mechanical shutter, if equipped with no STM, cannot detect an intermediate position of the shutter during a shifting operation. Thus, the simple mechanical shutter can only rely on mechanical contact to detect opened and closed positions.

Furthermore, unequivocally controlling the action of a mechanical shutter is difficult. Thus, the conventional method for calculating the actual exposure time cannot be directly applied to this kind of mechanical shutter. Furthermore, to improve the shutter speed, the type of a mechanical shutter may be changed from a uniform motion type to an accelerated motion type. However, the conventional calculation method cannot be applied to the accelerated motion type. As described above, when a mechanical shutter having a simple control mechanism and causing accelerated motion is used, accurately calculating the actual light exposure is difficult.

SUMMARY OF THE INVENTION

Embodiments of the present invention are directed to a technique capable of overcoming or at least mitigating the above-described problems.

According to an aspect of the present invention, an exemplary embodiment is directed to a method for calculating an actual exposure time in a still image shooting operation of an optical apparatus which includes a mechanical diaphragm unit, a mechanical shutter, and an image sensor. The method includes calculating an acceleration of the shutter based on a time required for the shutter to shift between two points in a shutter closing action, and obtaining a relationship between a shutter shifting amount and time based on the calculated acceleration; obtaining, based on the relationship between a shutter shifting amount and time, a relationship between an aperture area and time, wherein the aperture area represents an area of an aperture defined by the diaphragm unit having a predetermined F-number and the shutter; obtaining a total light exposure during a period of time required for the shutter to completely close the aperture of the diaphragm unit having the predetermined F-number, by temporally integrating the aperture area; and obtaining an actual exposure time by dividing the total light exposure by a light exposure per unit time calculated from an aperture area of the diaphragm unit having the predetermined F-number in an opened state.

According to another aspect of the present invention, an exemplary embodiment is directed to an optical apparatus including a mechanical diaphragm unit, a mechanical shutter, and an image sensor, and configured to capture a still image based on a calculated actual exposure time. The optical apparatus includes a calculation unit configured to calculate an acceleration of the shutter based on a time required for the shutter to shift between two points in a shutter closing action, and obtain a relationship between a shutter shifting amount and time based on the calculated acceleration. Furthermore, the optical apparatus includes a unit configured to obtain, based on the relationship between a shutter shifting amount and time, a relationship between an aperture area and time, wherein the aperture area represents an area of an aperture defined by a diaphragm having a predetermined F-number and the shutter. Still further, a total light exposure acquiring unit is provided to obtain a total light exposure during a period of time required for the shutter to completely close an aperture of the diaphragm having the predetermined F-number, by temporally integrating the aperture area. Also, an actual exposure time acquiring unit is provided to obtain an actual exposure time by dividing the total light exposure by a light exposure per unit time calculated from an aperture area of the diaphragm having the predetermined F-number in an opened state.

According to another exemplary embodiment of the present invention, even when a shutter is equipped with no position detector and can only control the open and close positions based on mechanical contact, the actual exposure time can be accurately calculated based on the acceleration of the shutter and the temporal change of the diaphragm aperture caused by the shutter.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 is a flowchart showing an example processing procedure of a microcomputer according to an exemplary embodiment.

DETAILED DESCRIPTION OF THE EMBODIMENTS

Figure 1:
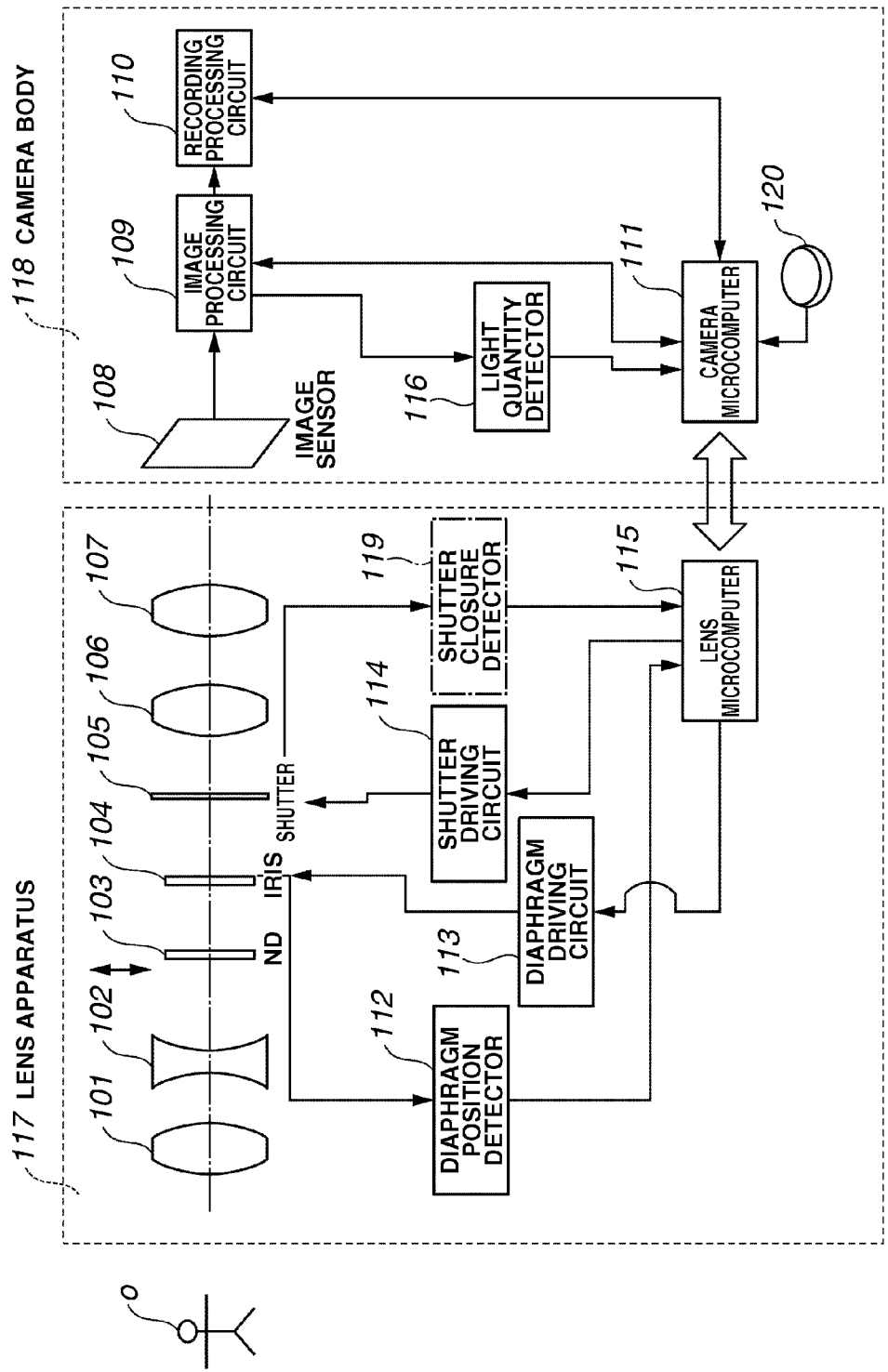
FIG. 1 is a schematic diagram illustrating an example imaging system in accordance with an exemplary embodiment.

The following description of exemplary embodiments, features and aspects of the present invention is merely illustrative in nature and is in no way intended to limit the invention, its application, or uses.

It is noted that throughout the specification, similar reference numerals and letters refer to similar items in the following figures, and thus once an item is defined in one figure, it may not be discussed in following figures.

Various exemplary embodiments, features, and aspects of the invention will now herein be described in detail below with reference to the drawings.

FIG. 1 shows an exemplary lens interchangeable imaging system, according to which a lens apparatus 117 is detachably mounted on a camera body (imaging apparatus) 118.

First, light arriving from an object "O" enters the lens apparatus 117, in which the light successively passes through optical members of an imaging optical system. Then, the light enters the camera body 118. The imaging optical system includes a stationary lens unit 101, a zoom lens unit (variator) 102 controlling a variable power, a diaphragm (iris) 104, a mechanical shutter 105, another stationary lens unit 106, and a focus lens unit 107 disposed in this order from the object side.

The lens apparatus 117 further includes a neutral density (ND) filter 103 that can adjust the light quantity in a stepwise fashion. The ND filter 103 can shift in a direction perpendicular to the light path between the zoom lens unit 102 and the diaphragm 104. The diaphragm 104 is a mechanical type that includes a set of movable blades (or sectors) capable of discretely or continuously adjusting the quantity of light passing therethrough.

The diaphragm 104 and the mechanical shutter 105, provided separately, can cause a cooperative action (i.e., a motion from an opened position to a fully closed position) for realizing a still image shooting.

Light, having entered the camera body 118 from the imaging optical system, reaches an image sensor 108. The image sensor 108 is constructed, for example, from an interlace charge-coupled device (CCD) sensor or a complementary metal-oxide semiconductor (CMOS) sensor. The image sensor 108 can convert an object image formed on its light-receiving surface into an electric signal. An image processing circuit 109 can apply AGC (automatic gain control) processing and color adjustment processing to the output signal of the image sensor 108.

A recording processing circuit 110 can successively receive processed image signals from the image processing circuit 109, and can store the received image signals as a video signal into a recording medium (not shown). The video signal includes, for example, 60 fields per second according to the NTSC system or 50 fields per second according to the PAL system or the like.

A light quantity detector 116 can determine whether the current video signal has an appropriate quantity of light, based on the video signal output from the image processing circuit 109. The measurement value (detection evaluation value) output from the light quantity detector 116 is sent, as an evaluation value of the light entering the image sensor 108, to a camera microcomputer 111.

The camera microcomputer 111 is electrically connected to a lens microcomputer 115 to perform data communications. The communications between the camera microcomputer 111 and the lens microcomputer 115 can be performed at the cycle equal to 1/60 sec according to the NTSC system or 1/50 sec according to the PAL system.

More specifically, when triggered by a communication start signal, the camera microcomputer 111 and the lens microcomputer 115 can start serial communications to exchange information and data. The data communications between the camera microcomputer 111 and the lens microcomputer 115 include camera setting information, lens setting information, AF (auto focus) information, zoom information, diaphragm information, shutter information, and other information required for the lens or camera control.

The lens microcomputer 115 can perform a diaphragm control based on the information and data obtained from the light quantity detector 116. The diaphragm 104 includes a diaphragm position detector 112 that can detect the position of the movable blades defining an opening state (i.e., an aperture diameter). In other words, the diaphragm position detector 112 can electrically detect a current diaphragm position, i.e., an aperture value (F-number). A diaphragm driving circuit 113 can change the position (i.e., actuate the blades) of the diaphragm 104.

The lens microcomputer 115 can calculate the driving amount of the blades required to realize an aperture value corresponding to the detection evaluation value obtained from the light quantity detector 116. The lens microcomputer 115 can perform, via the diaphragm driving circuit 113, a position servo control of the blades to control the aperture diameter. Thus, the lens microcomputer 115 can perform an optimized light quantity control by repeating the above-described sequential operations starting from the light detection evaluation to the actuation of the diaphragm 104.

The mechanical shutter 105 can take two stable states, i.e., an opened state and a fully closed state. In a moving image shooting mode, the shutter driving circuit 114 can fix the mechanical shutter 105 in the opened state. Also, a shutter closure detector 119 is provided.

Furthermore, the camera body 118 includes a release switch 120 which a user can operate in a still image shooting mode. When the release switch 120 is half pressed (S1 ON), the imaging apparatus starts a still image shooting preparatory action. The still image shooting preparatory action includes operations for bringing the imaging optical system into an in-focus condition relative to an object to be imaged and driving the diaphragm 104 to obtain an appropriate exposure.

In general, an exposure in the still image shooting mode is automatically determined based on the AGC, the aperture value, and the shutter speed. However, a photographer can operate a selection unit (not shown) to select a shutter priority mode or an aperture priority mode. When the release switch 120 is fully pressed (S2 ON), the imaging apparatus starts a still image shooting operation based on the mechanical shutter control and the electronic shutter control.

Figure 2:
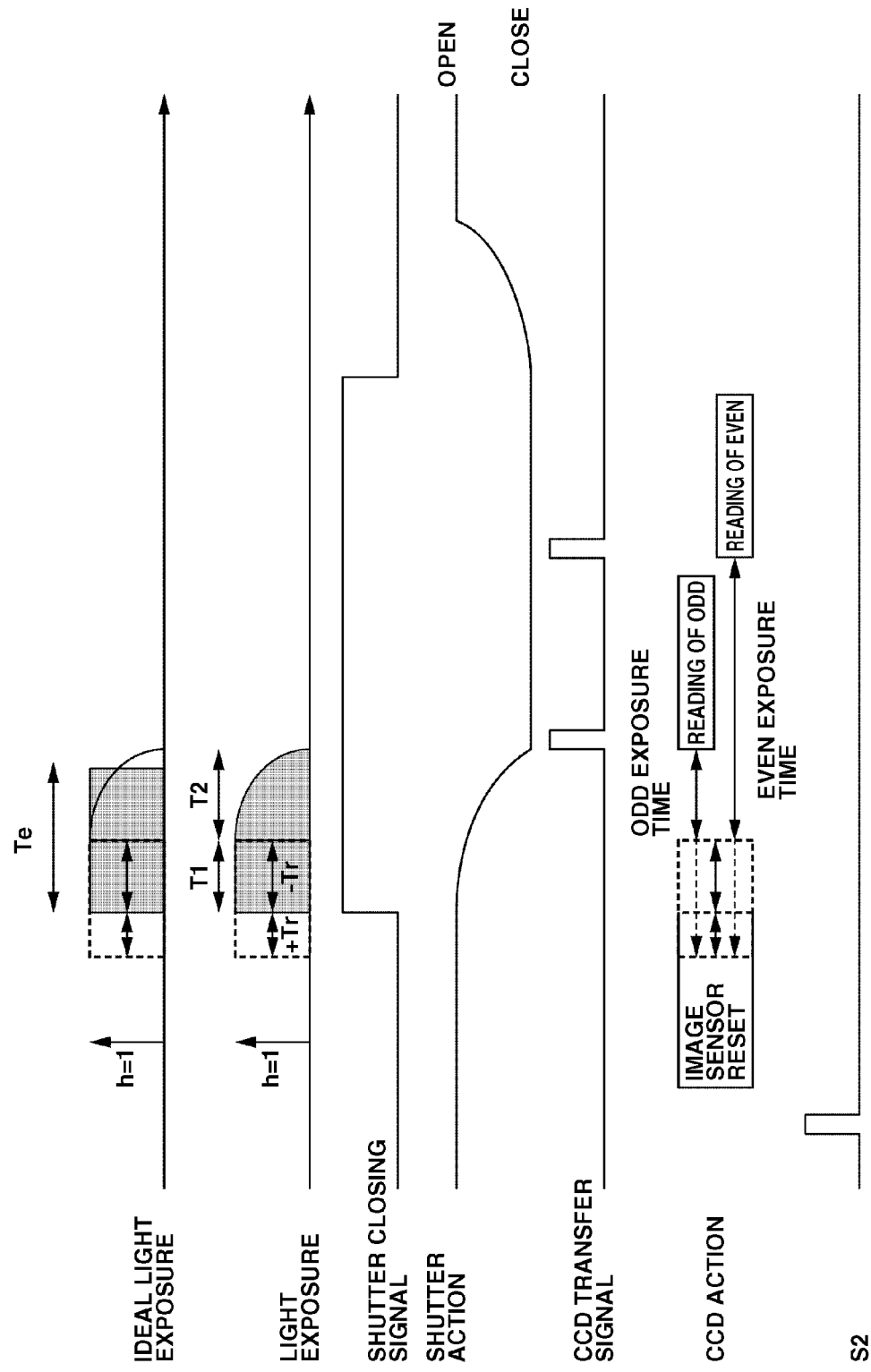
FIG. 2 is a timing diagram showing an example shutter action according to an exemplary embodiment.

FIG. 2 is a timing chart showing (from the bottom to top of page), the timing of a release signal S2 generated when the release switch 120 is fully pressed, the timing of a CCD action (electronic shutter control), the output timing of a CCD transfer signal, the position of the mechanical shutter 105, the output timing of a shutter closing signal, an actual light exposure on the image sensor 108, and an ideal light exposure.

When the release switch 120 is fully pressed (S2 ON), the imaging apparatus starts a CCD reset action for resetting electric charge stored in the image sensor 108. The image sensor 108 starts storing electric charge, and the camera microcomputer 111 transmits a shutter closing signal (command signal) to the lens microcomputer 115. At this moment, the mechanical shutter 105 is in a fully opened position.

The lens microcomputer 115, after receiving the shutter closing signal, causes a timer to count the time. When the timer has counted a predetermined time after the image sensor 108 started storing electric charge, the shutter driving circuit 114 starts closing the mechanical shutter 105. The mechanical shutter 105 moves with a constant acceleration from the fully opened position to the fully closed position.

In this case, the image sensor 108 can receive the light having a constant light quantity per unit time before the mechanical shutter 105 starts blocking the light flux passing through the diaphragm aperture. Then, in accordance with the light blocking action performed by the mechanical shutter 105 that can gradually block (or stop) the light flux passing through the diaphragm aperture, the quantity of light exposure approaches toward 0 and finally reaches 0, as shown by the "light exposure" in FIG. 2.

The time period Tr indicted by Tr+ or Tr− in FIG. 2 represents a period of time between termination of the electronic shutter action and start of a closing action of the mechanical shutter 105. A time period T1 represents a period of time from the timing the mechanical shutter 105 has started the closing action to the timing the mechanical shutter 105 reaches a light blocking start position (i.e., a position where the mechanical shutter 105 starts blocking the light flux passing through the diaphragm aperture). A time period T2 represents a period of time from the timing the mechanical shutter 105 has reached the light blocking start position to the timing the mechanical shutter 105 reaches the fully closed position.

During the time period T2, the image sensor 108 can receive the light flux gradually decreasing in the light exposure. The entire light exposure is equivalent to an area obtainable by adding or subtracting an area corresponding to time period Tr from the sum of a rectangular area corresponding to the time period T1 and a semicircular area corresponding to the time period T2 (see FIG. 2). The entire light exposure, when divided by a light exposure "h" per unit time, is equivalent to an actual exposure time Te.

The actual exposure time Te is equivalent to a shutter opening time required for the mechanical shutter 105 to perform an ideal exposure action causing no gradual change of the aperture. A reciprocal of the actual exposure time Te is an actual exposure speed. The time period Tr can be defined as a positive value when it is earlier than the generation of the shutter closing signal and a negative value when later than the generation of the shutter closing signal.

The actual exposure time Te represents an actual exposure time corresponding to "Tr=0," if it is not specially mentioned. After the mechanical shutter 105 is closed, the electric charge of an odd number pixel (ODD) of the image sensor 108 is read out at the first output timing of the CCD transfer signal. Then, the electric charge of an even number pixel (EVEN) is read out at the next output timing of the CCD transfer signal, as shown by the "CCD action" in FIG. 2.

Thus, the reading timing of the ODD is earlier than the reading timing of the EVEN. An inherent exposure time of the ODD is different from an inherent exposure time of the EVEN. However, the mechanical shutter 105 is completely closed before starting the reading of the ODD. Therefore, the actual light exposure of the ODD is identical to the actual light exposure of the EVEN.

After the reading operation for the ODD and the EVEN is finished, the shutter driving circuit 114 starts opening the mechanical shutter 105. Then, the shutter driving circuit 114 maintains the mechanical shutter 105 at the fully opened state until the next still image shooting begins.

The mechanical shutter 105, driven by a constant-current driving circuit, requires a constant time to shift from the fully opened position to the fully closed position. Accordingly, the shutter speed is always constant. To change the shutter speed, the CCD reset timing of the electronic shutter can be changed according to the present exemplary embodiment, so that the shutter speed and the actual exposure time can be freely changed.

Figure 3A:
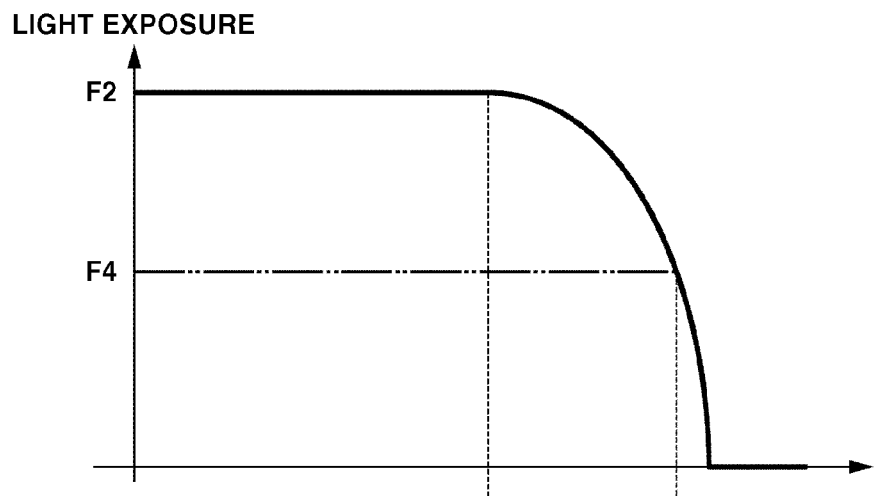
FIG. 3A is a graph showing example shutter actions corresponding to practical F-numbers of the diaphragm according to an exemplary embodiment.

FIG. 3A is a graph showing the light exposure changing in accordance with the action of the mechanical shutter 105 when the aperture value (F-number) is F2 or F4. The ordinate axis represents the light exposure, and the abscissa axis represents the time. In the present exemplary embodiment, the diaphragm 104 and the mechanical shutter 105 are separate components. The mechanical shutter 105, driven by a constant-current driving circuit, can move with a uniform acceleration.

Accordingly, even when the F-number is changed, the action time required for the mechanical shutter 105 to move from the fully opened position to the fully closed position does not change. On the other hand, the light exposure "h" per unit time changes according to the change of F-number.

Also, the length of the time period (i.e., part of T1) from the timing the mechanical shutter 105 starts the closing action to the timing the mechanical shutter 105 reaches the light blocking start position (i.e., a position where the mechanical shutter 105 starts blocking the light flux passing through the diaphragm aperture) changes according to the change of F-number. The length of the time period T2 required for the mechanical shutter 105 to move from the light blocking start position to the fully closed position changes according to the change of F-number.

Figure 3B:
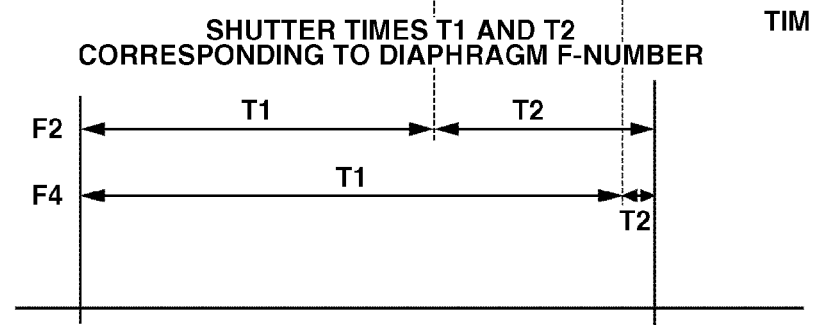
FIG. 3B is a diagram showing example shutter times T1 and T2 corresponding to F-numbers of the diaphragm in accordance with an exemplary embodiment.
Figure 3C:
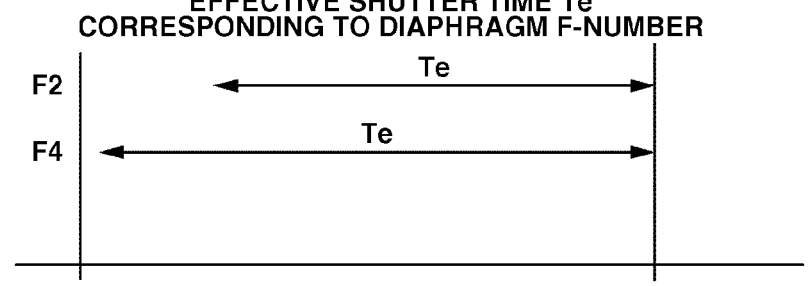
FIG. 3C is a diagram showing an actual exposure time Te corresponding to F-numbers of the diaphragm in accordance with an exemplary embodiment.

FIG. 3B shows the lengths of time periods T1 and T2 corresponding to respective F-numbers F2 and F4. The time period T1 of the F-number F4 is longer than the time period T1 of the F-number F2. The time period T2 of the F-number F4 is shorter than the time period T2 of the F-number F2. The actual exposure time is longer as the time period T1 is longer. As shown in FIG. 3C, the actual exposure time of the F-number F4 is longer than the actual exposure time of the F-number F2. In other words, the actual exposure time changes depending on the change of the F-number. As the F-number is larger, the actual exposure time is longer.

In the present exemplary embodiment, when the imaging apparatus performs a still image shooting operation, an effective exposure time Te corresponding to the F-number and an actual exposure time corresponding to a detected F-number are transmitted from the lens microcomputer 115 to the camera microcomputer 111. The camera microcomputer 111 controls the CCD reset timing for the electronic shutter control based on the received actual exposure time Te, so that the shutter speed in the still image shooting operation can be set to a desired value.

For example, the camera microcomputer 111 can calculate the CCD reset timing for the electronic shutter control based on the actual exposure time Te in the following manner.

It is now assumed that the F-number is F2, the time period T1 is 12 ms, the time period T2 is 2 ms (i.e., T1+T2=14 ms), and the actual exposure time Te is 13 ms. For example, a shutter speed equal to 1/100 sec (=10 ms) can be obtained in the following manner.

Te−(shutter time)=13−10=+3 ms=Tr

Accordingly, the imaging apparatus is required to complete the CCD reset action at the timing 3 ms later than the closing action start timing of the mechanical shutter 105.

Furthermore, a shutter speed equal to 1/60 sec (=16.6 ms) can be obtained in the following manner.

Te−(shutter time)=13−16.6=−3.6 ms=Tr

Accordingly, the imaging apparatus is required to complete the CCD reset action at the timing 3.6 ms earlier than the closing action start timing of the mechanical shutter 105.

T2 and Te values corresponding to an F-number can be obtained based on later-described calculations. The calculation result can be stored in a memory (e.g., EEPROM) of the lens microcomputer 115.

Next, the processing procedure of the lens microcomputer 115 will be described with reference to the flowchart shown in FIG. 4.

After the processing starts (step S400), in step S401, the lens microcomputer 115 determines whether a communication start signal is received from the camera microcomputer 111. If the communication start signal is received (i.e., YES in step S401), the processing flow proceeds to step S402. If no communication start signal is received (i.e., NO in step S401), the processing flow returns to step S401.

In step S402, the lens microcomputer 115 determines whether the communication involves the S2 signal. If the S2 signal is not involved, the processing flow proceeds to step S409. In step S409, the lens microcomputer 115 detects the present diaphragm position (i.e., F-number).

Subsequently, the lens microcomputer 115 reads out the information corresponding to an actual exposure time and a limit shutter time corresponding to the detected F-number and transmits the readout information to the camera microcomputer 111 at constant intervals. The camera microcomputer 111 performs the electronic shutter control based on latest information received from the lens microcomputer 115.

On the other hand, in step S402, if the S2 signal is involved, the processing flow proceeds to step S403. In step S403, the lens microcomputer 115 causes the timer to start measuring the shutter closing action start timing. When the time Tc has elapsed in step S404 (i.e., YES in step S404), the processing flow proceeds to step S405. In step S405, the lens microcomputer 115 causes the mechanical shutter 105 to start the closing action.

In general, the shutter action timing varies depending on individual differences of a lens apparatus and a mechanical shutter. Thus, the time Tc for waiting the shutter closing action is provided to adjust the closing action of the mechanical shutter to complete at the same timing. A similar effect can be obtained if the start timing of the shutter closing action is changed instead of changing the CCD reset time.

In step S406, the lens microcomputer 115 causes the timer to start measuring a time To. In step S407, the lens microcomputer 115 determines whether the time To has elapsed. When the time To has elapsed (i.e., YES in step S407), the reading operation for the ODD and the EVEN is finished. In step S408, the lens microcomputer 115 causes the mechanical shutter 105 to shift from the fully closed position to the opened position. The lens microcomputer 115 performs the above-described processing in the still image shooting mode.

Although the above-described exemplary embodiment has been described based on a CCD sensor serving as the image sensor 108, the similar processing can be performed even when the CCD sensor is replaced by a CMOS sensor.

When a CMOS sensor is used, the reading operation of the electric charge can be performed for each pixel or each line. A CMOS transfer signal designating a pixel or a line can be used to read out the electric charge. Thus, a temporal difference may be present between pixel reading times. Hence, similar to the reading operation for the CCD sensor, the exposure times of all pixels can be equalized by resetting all pixels constituting the CMOS sensor so as to equalize the exposure start time and by closing the mechanical shutter 105 so as to equalize the exposure end time.

Figure 6:
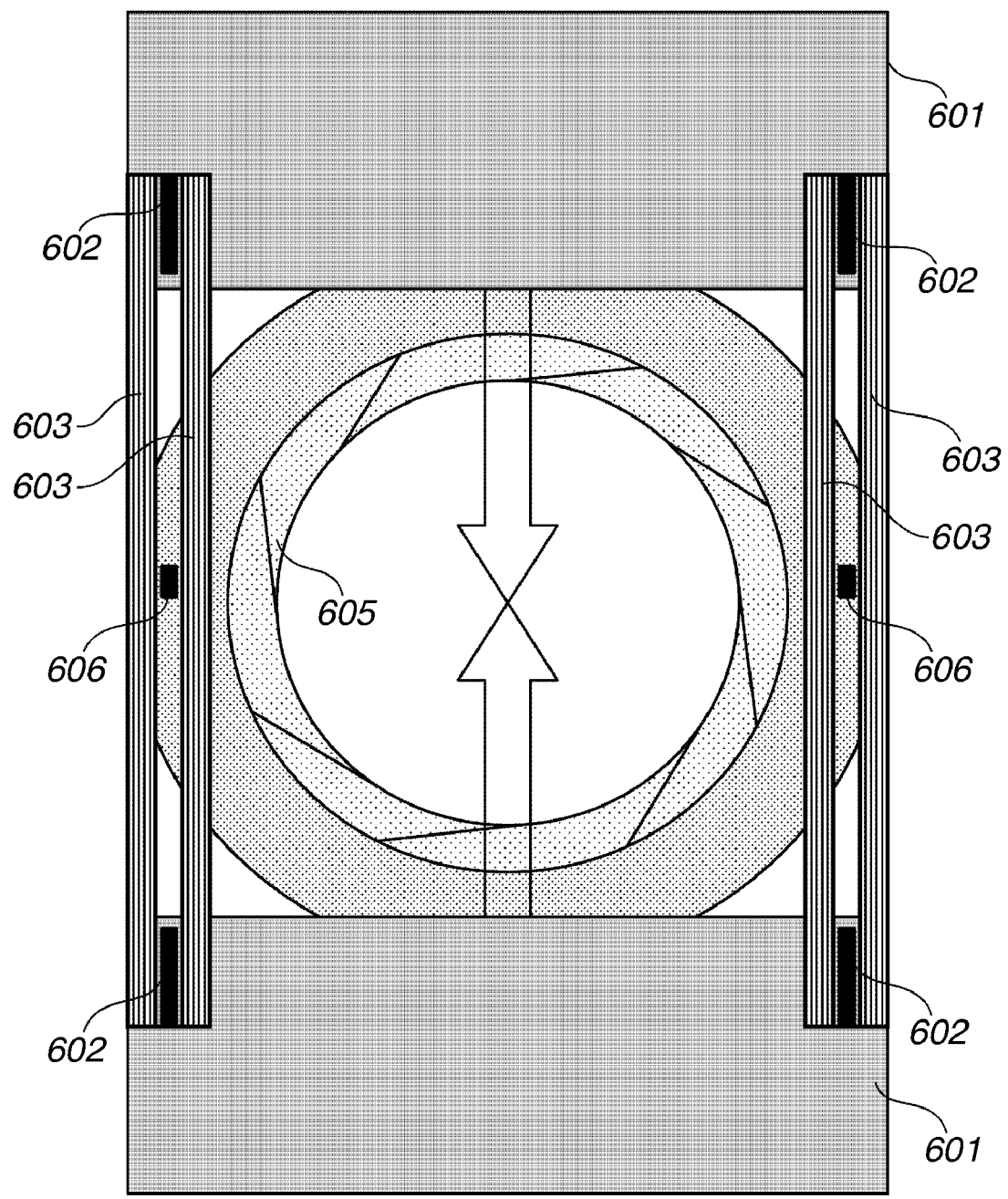
FIG. 6 is a diagram schematically illustrating a example arrangement of a diaphragm and a shutter in accordance with an exemplary embodiment.

The actual exposure time of the shutter can be calculated in the following manner. FIG. 6 is a diagram illustrating a practical arrangement of a shutter and a diaphragm corresponding to the shutter 105 and the diaphragm (iris) 104 shown in FIG. 1. A pair of protrusions 602 made of a permanent magnet can slide along parallel rails 603 in the up-and-down direction (as indicated by arrows) to drive a shutter body 601. The shutter body 601 can slide until the protrusions 602 stop at a mechanical edge 606 where the shutter body 601 can completely block or stop the light flux passing through the diaphragm 605.

The driving force of the shutter is the Lorentz force generated from an interaction between the permanent magnet (i.e., protrusion 602) disposed on the shutter and the current flowing in the coil wound around the rail 603. The shutter, driven by a constant-current driving circuit, can shift with a uniform acceleration. On the other hand, the diaphragm 605 is configured to gradually reduce a circular shape of the aperture that the light flux can pass through.

Figure 7:
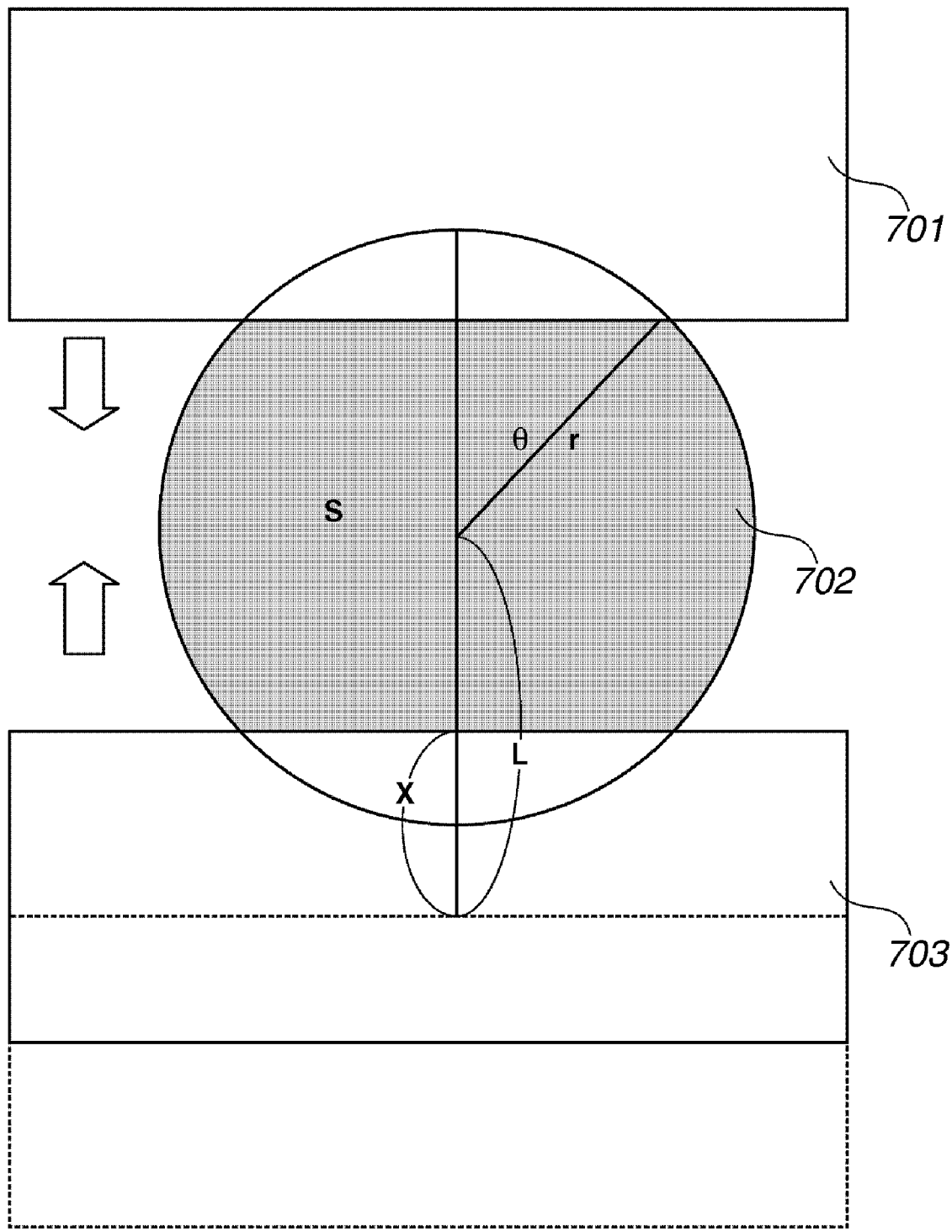
FIG. 7 is a view illustrating an example light flux area calculation model defined by a diaphragm and a shutter according to an exemplary embodiment.

The exemplary model shown in FIG. 7 can be used to calculate the actual exposure time obtainable when the diaphragm (702) and the shutter (701, 703) are combined. In FIG. 7, "r" represents a radius of the diaphragm, "L" represents a distance from the diaphragm center to the shutter start position, "x" represents an advancement (shift amount) of the shutter, "θ" represents an angle formed between the advancing direction of the diaphragm and an oblique line extending from the diaphragm center to a crossing point of the shutter and an outer periphery of the light flux, and "S" represents an area of the light flux at the moment the shutter has advanced by the shift amount "x."

When the F-number is small (bright), the radius "r" of the diaphragm shown in FIG. 7 is large. When the F-number is large (dark), the radius "r" is small. The circular area, obtainable when the shutter is fully opened, is equivalent to the light exposure per unit time corresponding to a certain F-number. The gray area S, sandwiched between the upper and lower shutter blades, is an area of the light flux during the closing action of the shutter.

The area S can be obtained by subtracting a connotative triangular area from a sectorial area having a central angle θ, as follows.

$$S = \pi r^2 - 4\left(\pi r^2 \cdot \frac{\theta}{360} - \frac{1}{2}r^2\sin\theta\cos\theta\right)$$

The above equation shows that the angle θ is a temporally changing factor. The shifting amount "x" of the closing shutter in a uniform accelerated motion can be expressed by the following equation.

$$x = \frac{1}{2}a(t-t_0)^2 + v_0(t-t_0)$$

where "a" represents the acceleration, "t" represents the time elapsed since the shutter constant-current driving circuit is turned on, "t0" represents the time required for the shutter to actually start moving after the shutter constant-current driving circuit is turned on, and "$v_0$" represents an initial speed of the shutter.

From the geometric relationship, $$r\cos\theta = L - x$$

When $T = t - t_0$, the relationship $r\cos\theta = L - \frac{1}{2}aT^2 - v_0T$ can be derived.

The angle θ shown in the above equation is effective in the range of 0 to 90° or x>L−r. Then, the following relationship can be derived.

$$\cos\theta = \frac{L}{r} - \frac{aT^2}{2r} - \frac{v_0T}{r} = \frac{2L - aT^2 - 2v_0T}{2r}$$

$$\theta = \cos^{-1}\left(\frac{2L - aT^2 - 2v_0T}{2r}\right)$$

$$\sin\theta^2 + \cos\theta^2 = 1,$$

Thus, $$\sin\theta^2 = 1 - \cos\theta^2$$

$$\sin\theta^2 = 1 - \left(\frac{2L - aT^2 - 2v_0T}{2r}\right)^2$$

$$\sin\theta = 1 - \frac{\sqrt{4L^2 - 4aLT^2 + a^2T^4 - 8L^2v_0T + 8aLv_0T^3 - 2a^2v_0T^5 + 4v_0^2T^2}}{2r}$$

The equation of the area S can be replaced by the following equation involving the variable T.

$$S = \pi r^2 - 4\left\{\begin{array}{l}\pi r^2 \cdot \frac{1}{360}\cos^{-1}\left(\frac{2L - aT^2 - 2v_0T}{2r}\right) - \\ \frac{1}{2}r^2\left(1 - \frac{\sqrt{4L^2 - 4aLT^2 + a^2T^4 - 8L^2v_0T + 8aLv_0T^3 - 2a^2v_0T^5 + 4v_0^2T^2}}{2r}\right) \\ \left(\frac{2L - aT^2 - 2v_0T}{2r}\right)\end{array}\right\}$$

The above equation is effective only when the shutter and the diaphragm are in an overlapped relationship, and T1 can be calculated separately. In other words, the above equation is effective after the shutter starts blocking the light flux having passed through the diaphragm and before the shutter is completely closed.

$$V = at \text{ and } v_0 = aT_1$$

Furthermore, when $T_1$ represents the time required for the shutter to reach the diaphragm, $T_1$ and $v_0$ can be obtained as follows.

$$L - r = \frac{1}{2}aT_1^2$$

$$T_1 = \sqrt{\frac{2(L-r)}{a}}$$

$$v_0 = a\sqrt{\frac{2(L-r)}{a}}$$

Accordingly, the actual exposure time can be obtained from the total light exposure divided by the light exposure per unit time corresponding to a certain F-number in an opened condition, and then adding the time T1 required for the shutter to reach the diaphragm.

$$\text{Actual Exposure Time} = \frac{\int_0^{\sqrt{\frac{2r}{a}}} S dt}{\pi r^2} + T_1$$

$$= \frac{\int_0^{\sqrt{\frac{2r}{a}}} S dt}{\pi r^2} + \sqrt{\frac{2(L-r)}{a}}$$

The time $T_2$ can be expressed as follows.

$$T_2 = \sqrt{\frac{2L}{a}}$$

The actual exposure time for each F-number can be obtained by inputting a fixed value L (dependent on the layout and the shape of the diaphragm and the shutter), F (dependent on the F-number of the diaphragm), and the acceleration "a."

The acceleration "a" can be calculated as follows.

$$a = \frac{2L}{t^2}$$

Thus, the acceleration "a" can be obtained by measuring the shutter closing time (T1+T2) based on a later-described method using a measuring device, or directly measuring the time (T1+T2) using a shutter equipped with an edge detection switch, and then inputting the obtained value into "t" of the above equation.

Then, the obtained acceleration is input into the above equation to obtain the actual exposure time corresponding to each F-number. However, an actual diaphragm area may not be a perfect circle. Furthermore, an actual shutter may not include upper and lower portions vertically shifting to close. However, it is possible to calculate an equation obtaining an area of the light flux temporally changing, and obtaining the acceleration of the shutter to calculate the actual exposure time in the same manner. In short, the present invention can be effectively applied to various types of diaphragms.

Next, the method for measuring the time (T1+T2) will be described. First, the measuring method applied to a lens apparatus having a shutter equipped with an edge detection switch will be described.

When a shutter closure detector 119 is provided as shown in FIG. 1, the lens microcomputer 115 can measure the period of time from generation of the shutter closing signal to the timing the shutter closure detector 119 detects a shutter closed state. The measurement value is equal to the time (T1+T2). The edge detection switch is, for example, attached to the mechanical edge 606 shown in FIG. 6, or may be a photo-interrupter.

Figure 5:
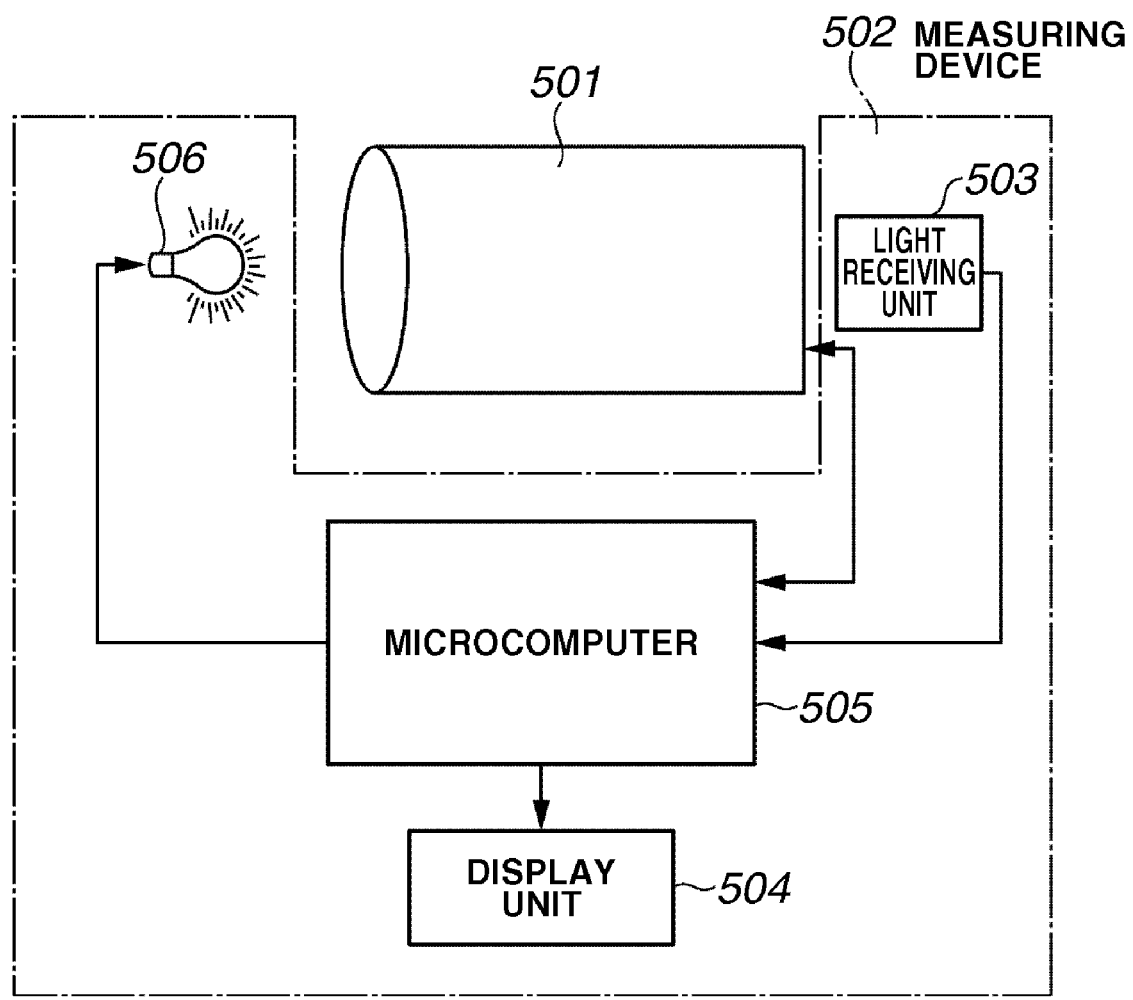
FIG. 5 is a circuit diagram illustrating an example measuring device measuring the characteristics of a mechanical shutter in a lens apparatus shown in FIG. 1.

The measuring method using a measuring device will be described below. For measurement, as shown in FIG. 5, a lens 501 corresponding to the lens apparatus 117 shown in FIG. 1 is attached to a measuring device 502 via a mount (not shown). The measuring device 502 includes a microcomputer 505 that can generate a command to be supplied to a light source 506. The light source 506, when turned on in response to the command supplied from the microcomputer 505, can emit light passing through the lens 501. A light receiving unit 503 can receive the light having passed through the lens 501 and can convert a quantity of the received light into an electric signal.

The electric signal is sent to the microcomputer 505. The microcomputer 505 includes an AD converter that can convert the received electric signal into a digital signal. The microcomputer 505 of the measuring device 502 is similar to the camera microcomputer 111 in that the microcomputer 505 can communicate with the lens microcomputer 115. Thus, the microcomputer 505 can set the diaphragm in an appropriate state and send the shutter signal S2 to start the shutter closing action.

Using a timer triggered by the generation of a shutter closing action signal, the microcomputer 505 measures the period of time until the output of the light receiving unit 503 becomes 0. The measured time is equal to the time (T1+T2). The measuring device 502 can also measure the times T1, T2, and Te. The microcomputer 505 can detect a position where the signal of the light receiving unit 503 is first changed.

The timer can measure a period of time from generation of a shutter closing action start signal to the change point of the received light quantity signal. The measured time is equal to T1. The timer can measure a period of time from the change point of the received light quantity signal to the timing the received light signal becomes 0. The measured time is equal to T2.

Furthermore, an AD converted value of the received light signal is integrated during the time period from the generation of the shutter closing action start signal to the timing the received light signal becomes 0. The integration result is divided by the received light signal value in an opened state to obtain the time Te. The time Te actually measured by the above-described shutter test machine may include an error resulting from disturbance light. Therefore, it is preferable to repeat the measurement for a predetermined number of representative F-numbers to obtain an average value of the time Te for each F-number. A display unit 504 can display the measurement result.

To reduce the measurement times, it is possible to measure the times Te and (T1+T2) for only one representative F-number and calculate the acceleration based on the measured time (T1+T2). The microcomputer 505 can calculate the actual exposure time as described above. Then, the microcomputer 505 can compare the calculation result with the actual measurement result. When the calculation value is equal to the actually measured value, the microcomputer 505 can obtain the time Te for another F-number based on calculations.

A shutter equipped with no position detector can only control the open and close positions based on mechanical contact, and cannot perform the uniform acceleration shutter action control. Even when such a simple shutter is used, the actual exposure time can be calculated based on the change of the aperture area and the acceleration of the diaphragm.

Furthermore, the acceleration of the diaphragm can be obtained from the actually measured time in the measuring device. The actual exposure time can be obtained based on the change of the aperture area and the obtained acceleration.

Furthermore, software program code for realizing the functions of the above-described exemplary embodiment can be supplied, via a storage medium (or a recording medium), to a system or an apparatus. A computer (or CPU or MPU) in the system or the apparatus can read the program code stored in the storage medium and can execute the readout program.

In this case, the program code read out from the storage medium can realize the functions of the exemplary embodiment. The equivalents of programs can be used if they possess comparable functions. Accordingly, when the functions or processes of the exemplary embodiment are realized by a computer, program code installed in the computer and a recording medium storing the program are used to implement the present invention.

In other words, the present invention encompasses a computer program that can realize the functions or processes of the exemplary embodiment or any recording medium that can store the program. In this case, the type of program can be any one of object code, interpreter program, and OS script data.

A recording medium supplying the program can be selected from any one of a flexible disk, a hard disk, an optical disk, a magneto-optical disk, an MO, a CD-ROM, a CD-R, a CD-RW, a magnetic tape, a nonvolatile memory card, a ROM, and a DVD (DVD-ROM, DVD-R).

The method for supplying the program includes accessing a home page on the Internet using the browsing function of a client computer, when the home page allows each user to download the computer program of the present invention, or compressed files of the programs having automatic installing functions, to a hard disk or other recording medium of the user.

Furthermore, the program code constituting the programs of the present invention can be divided into a plurality of files so that respective files are downloadable from different home pages. Namely, the present invention encompasses WWW servers that allow numerous users to download the program files so that the functions or processes of the present invention can be realized on their computers.

Moreover, enciphering the programs of the present invention and storing the enciphered programs in a CD-ROM or comparable recording medium is a practical method when the programs of the present invention are distributed to the users. The authorized users (i.e., users satisfying predetermined conditions) are allowed to download key information from a home page on the Internet. The users can decipher the programs with the obtained key information and can install the programs on their computers. When the computer reads and executes the installed programs, the functions of the above-described exemplary embodiment can be realized.

Additionally, not only the functions of the above-described exemplary embodiment can be realized by a computer that executes the programs, but also an operating system (OS) running on the computer can execute part or all of the actual processing based on instructions of the programs.

Furthermore, the program code read out of a storage medium can be written into a memory of a function expansion board equipped in a computer or into a memory of a function expansion unit connected to the computer. In this case, based on an instruction of the program, a CPU provided on the function expansion board or the function expansion unit can execute part or all of the processing so that the functions of the above-described exemplary embodiment can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-338133 filed Nov. 24, 2005, which is hereby incorporated by reference herein in its entirety.

What is claimed:

1. A method for calculating an actual exposure time in a still image shooting operation of an optical apparatus which includes a mechanical diaphragm unit, a mechanical shutter, and an image sensor, the method comprising:

calculating an acceleration of the shutter based on a time required for the shutter to shift between two points in a shutter closing action, and obtaining a relationship between a shutter shifting amount and time based on the calculated acceleration;

obtaining, based on the relationship between a shutter shifting amount and time, a relationship between an aperture area and time, wherein the aperture area represents an area of an aperture defined by the diaphragm unit having a predetermined F-number and the shutter;

obtaining a total light exposure during a period of time required for the shutter to completely close the aperture of the diaphragm unit having the predetermined F-number, by temporally integrating the aperture area; and obtaining an actual exposure time by dividing the total light exposure by a light exposure per unit time calculated from an aperture area of the diaphragm unit having the predetermined F-number in an opened state.

2. An optical apparatus including a mechanical diaphragm unit, a mechanical shutter, and an image sensor, wherein the optical apparatus is configured to capture a still image based on a calculated actual exposure time, the optical apparatus comprising:

a calculation unit configured to calculate an acceleration of the shutter based on a time required for the shutter to shift between two points in a shutter closing action, and obtain a relationship between a shutter shifting amount and time based on the calculated acceleration;

a unit configured to obtain, based on the relationship between a shutter shifting amount and time, a relationship between an aperture area and time, wherein the aperture area represents an area of an aperture defined by the diaphragm unit having a predetermined F-number and the shutter;

a total light exposure acquiring unit configured to obtain a total light exposure during a period of time required for the shutter to completely close an aperture of the diaphragm unit having the predetermined F-number, by temporally integrating the aperture area; and an actual exposure time acquiring unit configured to obtain an actual exposure time by dividing the total light exposure by a light exposure per unit time calculated from an aperture area of the diaphragm unit having the predetermined F-number in an opened state.

3. The optical apparatus according to claim 2, further comprising a control unit configured to control electric charge storage timing of the image sensor, wherein the control unit determines a shutter opening start time based on an electric charge storage starting function for the image sensor, and determines a shutter closing time based on a closing action of the mechanical shutter.

4. The optical apparatus according to claim 2, further comprising a storage unit configured to store predetermined acceleration data about the diaphragm unit, wherein the calculation unit calculates the relationship between a shutter shifting amount and a time based on the acceleration data stored on the storage unit.

5. The optical apparatus according to claim 2, further comprising a detection unit configured to detect a completely closed state of the shutter, wherein the calculation unit calculates the acceleration of the shutter based on a time required for the shutter to completely close after starting the shutter closing action.

6. The optical apparatus according to claim 2, the optical apparatus further comprising:

a camera body including a camera CPU, wherein the camera body includes the image sensor; and a lens apparatus configured to be attached to the camera body, the lens apparatus including a lens CPU, wherein the lens apparatus includes the mechanical diaphragm and the mechanical shutter, wherein an imaging reset function of the image sensor triggers a shutter opening action, and the mechanical shutter performs a shutter closing action.

7. The optical apparatus according to claim 2, the optical apparatus further comprising:

a lens apparatus; and an actual exposure time measuring device configured to measure characteristics of the lens apparatus, the actual exposure time measuring device comprising, a light source configured to emit light;

a closing signal generation unit configured to generate a shutter closing action start signal to the lens apparatus;

a light receiving unit configured to detect light emitted from the light source and having passed through the lens apparatus;

a calculation unit configured to detect closure timing of the shutter when a light quantity received by the light receiving unit becomes 0, to measure a period of time from generation timing of the shutter closing action start signal to closure timing of the shutter, and to calculate the acceleration of the shutter based on the measured period of time.

* * * * *